United States Patent
Koishikawa et al.

[11] Patent Number: 6,121,629
[45] Date of Patent: Sep. 19, 2000

[54] RADIATION IMAGE ERASING APPARATUS

[75] Inventors: Keisuke Koishikawa; Satoshi Arakawa, both of Kanagawa-ken, Japan

[73] Assignee: Fuji Photo Film Co., Ltd., Kanagawa-Ken, Japan

[21] Appl. No.: 09/120,201

[22] Filed: Jul. 22, 1998

[30] Foreign Application Priority Data

Jul. 22, 1997 [JP] Japan ................................. 9-195313
Jul. 22, 1997 [JP] Japan ................................. 9-195314

[51] Int. Cl.⁷ ................................................ G03B 42/02
[52] U.S. Cl. ............................................................ 250/588
[58] Field of Search .................................. 250/588, 581, 250/582, 584, 589

[56] References Cited

U.S. PATENT DOCUMENTS

3,444,372  5/1969  DeHart ................................. 250/483.1
5,065,021  11/1991  Arakawa .
5,412,222  5/1995  Hejazi ..................................... 250/588

*Primary Examiner*—Constantine Hannaher
*Assistant Examiner*—Albert Gagliardi
*Attorney, Agent, or Firm*—Sughrue, Mion, Zinn, Macpeak & Seas, PLLC

[57] ABSTRACT

A stimulable phosphor sheet, on which energy having been stored thereon during its exposure to radiation remains, is moved with respect to a plurality of fluorescent lamps, which produce erasing light. The erasing light is irradiated to the stimulable phosphor sheet while the stimulable phosphor sheet is being moved, and energy remaining on the stimulable phosphor sheet is thereby released. The plurality of the fluorescent lamps are located such that they may stand side by side with one another in a direction that intersects perpendicularly to the direction along which each of the fluorescent lamps extends. The direction, along which the stimulable phosphor sheet is moved with respect to the plurality of the fluorescent lamps, coincides with the direction along which each of the fluorescent lamps extends. Impartation of excessively high erasing energy to the stimulable phosphor sheet is thus restricted, and erasing energy efficiency is thereby enhanced.

3 Claims, 6 Drawing Sheets

POSITION IN LONGITUDINAL DIRECTION

FIG.5B

POSITION IN LONGITUDINAL DIRECTION

RADIATION IMAGE ERASING APPARATUS

BACKGROUND OF THE INVENTION

1. Field of the Invention

This invention relates to a radiation image erasing apparatus. This invention particularly relates to a radiation image erasing apparatus, wherein fluorescent lamps are employed as a source for producing erasing light.

2. Description of the Prior Art

Techniques for reading out a recorded radiation image in order to obtain an image signal, carrying out appropriate image processing on the image signal, and then reproducing a visible image by use of the processed image signal have here to fore been known invarious fields. Also, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

In the radiation image recording and reproducing systems, wherein the stimulable phosphor sheets are used, after the radiation image has been read out from a stimulable phosphor sheet, the stimulable phosphor sheet is exposed to erasing light, which is produced by a fluorescent lamp, or the like, and energy remaining on the stimulable phosphor sheet is thereby released. The erased stimulable phosphor sheet can again be used for the recording of a radiation image. Therefore, the erasing step for irradiating the erasing light to the stimulable phosphor sheet must be carried out after the step for reading out the radiation image from the stimulable phosphor sheet. A radiation image erasing apparatus for carrying out the erasing operation is often incorporated as a portion of a radiation image read-out apparatus, ordinarily, straight-tube fluorescent lamps are utilized as an erasing light source. Also, as in an example of a conventional radiation image erasing apparatus 20 shown in FIG. 6A, a stimulable phosphor sheet 11 is exposed to the erasing light, which is produced by straight-tube fluorescent lamps 21, 21, . . . , while the stimulable phosphor sheet 11 is being conveyed in a direction that is normal to the direction (the longitudinal direction) along which each of the straight-tube fluorescent lamps 21, 21, . . . extends. In this manner, the entire area of the stimulable phosphor sheet 11 is erased.

In the erasing step, it is necessary for erasing energy of a level at least equal to a predetermined threshold value ETh to be given to the entire area of the stimulable phosphor sheet 11. If the level of erasing energy given to a portion of the stimulable phosphor sheet 11 is lower than the threshold value ETh, non-uniformity in level of erasing of the stimulable phosphor sheet 11 will occur, and adverse effects will occur on the image signal detected from the stimulable phosphor sheet 11, on which the next radiation image has been stored.

Figure 6A:
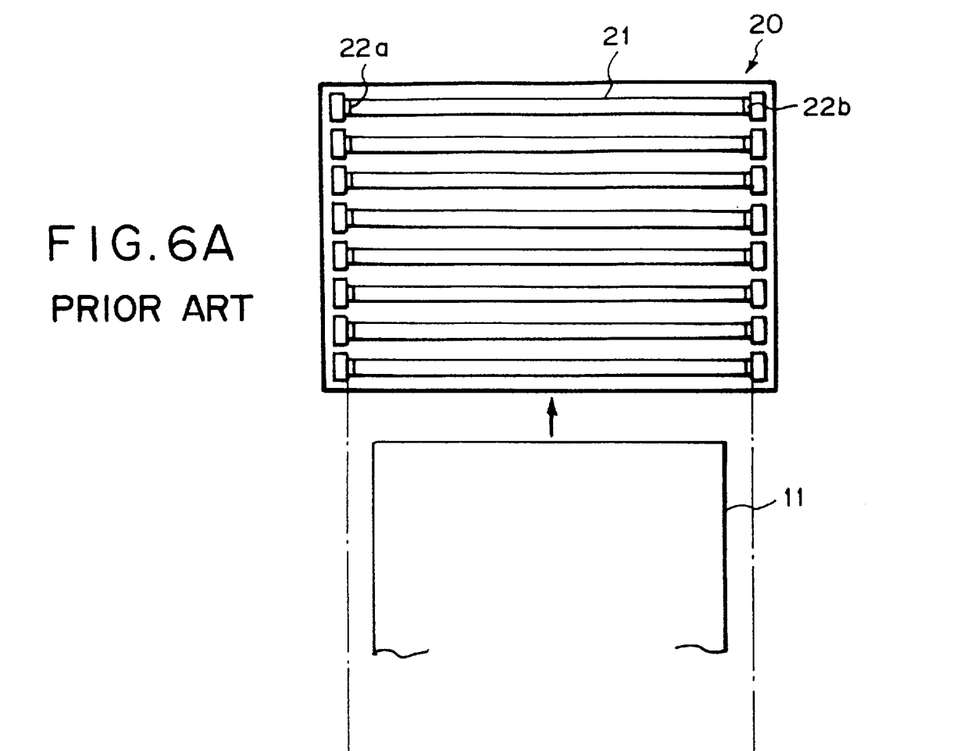
FIG. 6A is a plan view showing an example of a conventional radiation image erasing apparatus.
Figure 6B:
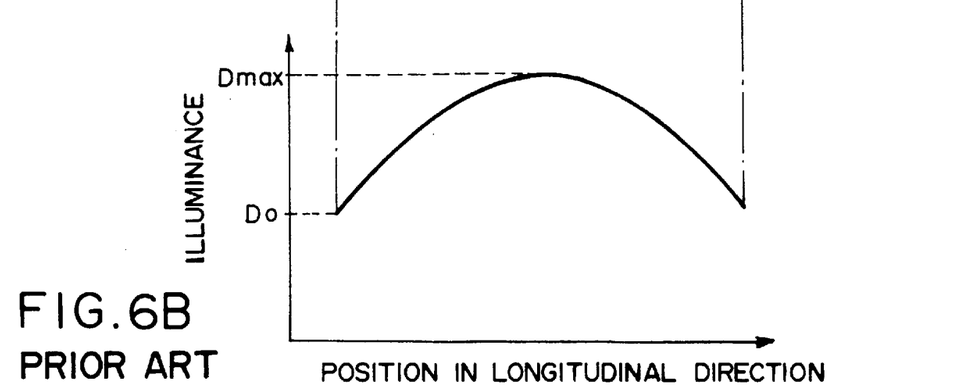
FIG. 6B is a graph showing an illuminance distribution obtained with the example of FIG. 6A.

With the straight-tube fluorescent lamps 21, 21, . . . , which are employed in the example of the conventional radiation image erasing apparatus 20 shown in FIG. 6A, the distribution of the illuminance in the direction, along which each of the straight-tube fluorescent lamps 21, 21, . . . extends, takes a pattern as shown in FIG. 6B.

Specifically, the illuminance is highest (i.e., equal to Dmax) at a middle portion of each of the straight-tube fluorescent lamps 21, 21, . . . and is low (i.e., equal to $D_0$) at portions in the vicinity of electrodes 22a and 22b, which are located at the two ends of each of the straight-tube fluorescent lamps 21, 21, . . . . The level of the illuminance represents the level of erasing energy. Therefore, it is necessary for the irradiating conditions (i.e., the irradiation time, the illuminance, and the like) of the straight-tube fluorescent lamps 21, 21, . . . to be set such that the illuminance at the portions in the vicinity of the electrodes 22a and 22b, which takes the lowest illuminance value $D_0$, may be higher than a threshold value DTh in the illuminance region corresponding to the aforesaid threshold value ETh of erasing energy. However, in such cases, at the middle portion of each of the straight-tube fluorescent lamps 21, 21, . . . , at which the illuminance is originally high (i.e., as high as Dmax), the level of erasing energy becomes excessively high, and useless high erasing energy is imparted to the stimulable phosphor sheet 11.

Figure 7A:
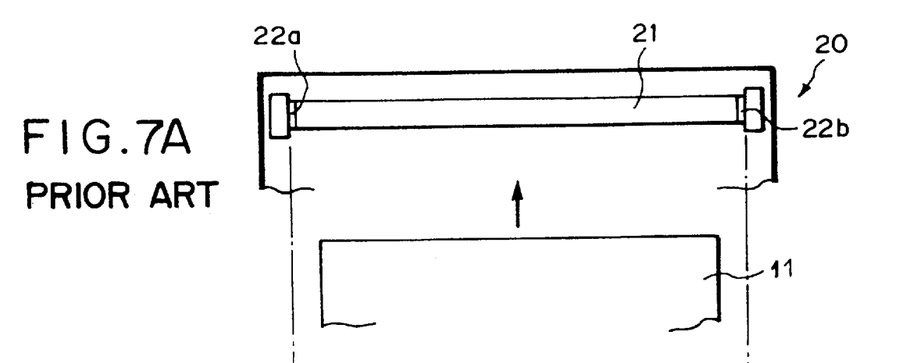
FIG. 7A is a plan view showing an example of a conventional radiation image erasing apparatus.

Also, in an example of the conventional radiation image erasing apparatus 20 shown in FIG. 7A, which may be incorporated as a portion of a radiation image read-out apparatus, a straight-tube fluorescent lamp 21 is employed as the erasing light source. In this example, the temperature distribution and the illuminance distribution in the longitudinal direction of the straight-tube fluorescent lamp 21 take patterns shown in FIG. 7B and FIG. 7C.

Figure 7B:
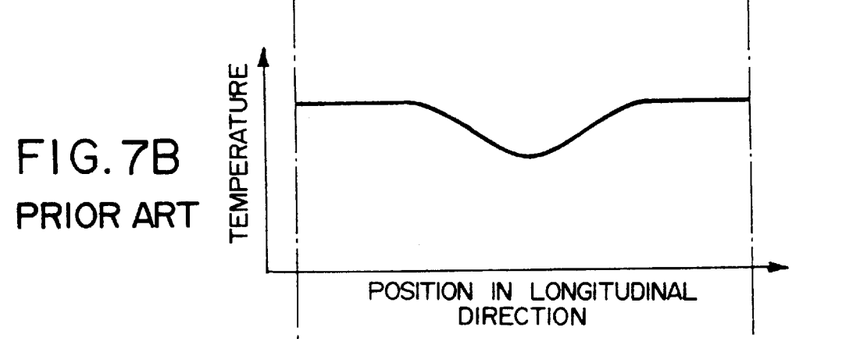
FIG. 7B is a graph showing a temperature distribution obtained with the example of FIG. 7A.
Figure 7C:
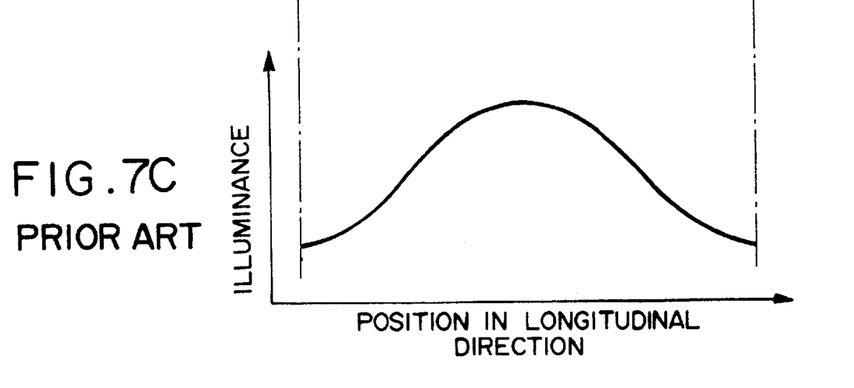
FIG. 7C is a graph showing an illuminance distribution obtained with the example of FIG. 7A.

As is understood from FIG. 7B, the temperatures at portions other than the middle portion of the straight-tube fluorescent lamp 21 are higher than the temperature at the middle portion. Also, as illustrated in FIG. 7C, the illuminance distribution is affected by the temperature distribution shown in FIG. 7B.

SUMMARY OF THE INVENTION

The primary object of the present invention is to provide a radiation image erasing apparatus, wherein impartation of excessively high erasing energy to a stimulable phosphor sheet is restricted, and erasing energy efficiency is thereby enhanced.

In a first radiation image erasing apparatus in accordance with the present invention, a plurality of fluorescent lamps are located such that they may stand side by side with one another in a direction that intersects perpendicularly to the direction along which each of the fluorescent lamps extends. Also, a stimulable phosphor sheet is moved with respect to the fluorescent lamps and in the direction along which each of the fluorescent lamps extends. Therefore, each portion of the stimulable phosphor sheet passes through positions corresponding to portions of the corresponding fluorescent lamp, which portions yield different levels of illuminance. As a result, the stimulable phosphor sheet is approximately uniformly exposed to the erasing light in the direction, along which the stimulable phosphor sheet is moved. Also, with respect to the direction that intersects perpendicularly to the direction, along which the stimulable phosphor sheet is moved, since the plurality of the fluorescent lamps stand side by side with one another, the illuminance becomes uniform. The erasing energy efficiency is thereby enhanced.

Specifically, the present invention provides a first radiation image erasing apparatus for moving a stimulable phosphor sheet, on which energy having been stored thereon during its exposure to radiation remains, with respect to a plurality of fluorescent lamps, which produce erasing light, irradiating the erasing light to the stimulable phosphor sheet while the stimulable phosphor sheet is being moved, and thereby releasing energy remaining on the stimulable phosphor sheet, wherein the plurality of the fluorescent lamps are located such that they may stand side by side with one another in a direction that intersects perpendicularly to the direction along which each of the fluorescent lamps extends, and the direction, along which the stimulable phosphor sheet is moved with respect to the plurality of the fluorescent lamps, coincides with the direction along which each of the fluorescent lamps extends.

In the first radiation image erasing apparatus in accordance with the present invention, as the fluorescent lamps, ordinary straight-tube fluorescent lamps, each of which extends in a straight line and has electrodes at the two ends, may be employed. Alternatively, the fluorescent lamps may be twin fluorescent lamps, twin 2-parallel fluorescent lamps, or U-tube fluorescent lamps, in which the electrodes are formed collectively on one end side with respect to the longitudinal direction.

Also, the first radiation image erasing apparatus should preferably be provided with a filter comprising a first half, over which the stimulable phosphor sheet passes firstly and which transmits light having short wavelengths, and a second half, over which the stimulable phosphor sheet passes secondly and which transmits light having wavelengths other than short wavelengths.

The first radiation image erasing apparatus in accordance with the present invention may be constituted as a single unit for irradiating the erasing light to the stimulable phosphor sheet and thereby releasing energy remaining on the stimulable phosphor sheet. Alternatively, the first radiation image erasing apparatus in accordance with the present invention may be connected with a radiation image read-out apparatus or may be incorporated as a portion of a radiation image read-out apparatus.

As will be understood from the specification, it should be noted that the term "moving a stimulable phosphor sheet with respect to a fluorescent lamp" as used herein means movement of the stimulable phosphor sheet relative to the fluorescent lamp, and embraces both the cases wherein the stimulable phosphor sheet is moved while the fluorescent lamp is kept stationary, and cases wherein the fluorescent lamp is moved while the stimulable phosphor sheet is kept stationary.

In a second radiation image erasing apparatus in accordance with the present invention, at least one fluorescent lamp, in which the electrodes, where the illuminance becomes low, are formed collectively at an end on one side with respect to a longitudinal direction, is employed, and the illuminance is thereby prevented from becoming low at an end on the other side with respect to the longitudinal direction, which end has no electrode. Also, an air stream is formed such that it may flow from a position corresponding to the end on one side with respect to the longitudinal direction, at which the electrodes are formed, toward the end on the other side with respect to the longitudinal direction, which end has no electrode. With the air stream, a comparatively high-temperature atmosphere occurring at the end, at which the electrodes are formed, is cooled. In this manner, uniformalizing of the temperature distribution in the longitudinal direction is enhanced, the illuminance is uniformalized, and the erasing energy efficiency is enhanced.

Specifically, the present invention also provides a second radiation image erasing apparatus for irradiating erasing light, which has been produced by at least one fluorescent lamp, to a stimulable phosphor sheet, on which energy having been stored thereon during its exposure to radiation remains, and thereby releasing energy remaining on the stimulable phosphor sheet, wherein electrodes of the fluorescent lamp are formed collectively at an end on one side with respect to a longitudinal direction of the fluorescent lamp, and an air stream forming means forms a predetermined air stream such that the air stream may flow from a position corresponding to the end on the one side, at which the electrodes are formed, toward an end on the other side with respect to the longitudinal direction.

In the second radiation image erasing apparatus in accordance with the present invention, the fluorescent lamp may be selected from a twin fluorescent lamp, a twin 2-parallel fluorescent lamp, and a U-tube fluorescent lamp.

Also, the air stream should preferably be formed such that a temperature distribution in the longitudinal direction of the fluorescent lamp may become uniform.

Further, the stimulable phosphor sheet may be moved with respect to the fluorescent lamp, and the entire area of the stimulable phosphor sheet may thereby be exposed to the erasing light. In such cases, the direction, along which the stimulable phosphor sheet is moved with respect to the fluorescent lamp, may coincide with the longitudinal direction of the fluorescent lamp, or may perpendicularly intersect with the longitudinal direction of the fluorescent lamp.

In such cases, the second radiation image erasing apparatus should preferably be provided with a filter comprising a first half, over which the stimulable phosphor sheet passes firstly and which transmits light having short wavelengths, and a second half, over which the stimulable phosphor sheet passes secondly and which transmits light having wavelengths other than short wavelengths.

The second radiation image erasing apparatus in accordance with the present invention may be constituted as a single unit for irradiating the erasing light to the stimulable phosphor sheet and thereby releasing energy remaining on the stimulable phosphor sheet. Alternatively, the second radiation image erasing apparatus in accordance with the present invention may be connected with a radiation image read-out apparatus or may be incorporated as a portion of a radiation image read-out apparatus.

With the first radiation image erasing apparatus in accordance with the present invention, the stimulable phosphor sheet is moved with respect to the fluorescent lamps and in the direction along which each of the fluorescent lamps extends. Therefore, each portion of the stimulable phosphor sheet passes through positions corresponding to portions of the corresponding fluorescent lamp, which portions yield different levels of illuminance. As a result, the stimulable phosphor sheet is approximately uniformly exposed to the erasing light in the direction, along which the stimulable phosphor sheet is moved. Also, the plurality of the fluorescent lamps are located such that they may stand side by side with one another in the direction that intersects perpendicularly to the direction along which each of the fluorescent lamps extends. Therefore, the illuminance can be uniformalized also with respect to the direction that intersects perpendicularly to the direction, along which the stimulable phosphor sheet is moved. Accordingly, the entire area of the stimulable phosphor sheet can be exposed uniformly to the erasing light, and the erasing energy efficiency can thereby be enhanced.

With the second radiation image erasing apparatus in accordance with the present invention, the fluorescent lamp, in which the electrodes, where the illuminance becomes low, are formed collectively at the end on one side with respect to the longitudinal direction, is employed. Therefore, the illuminance and the level of erasing energy can be prevented from becoming low at the end on the other side with respect to the longitudinal direction, which end has no electrode.

Also, with the second radiation image erasing apparatus in accordance with the present invention, the air stream is formed such that it may flow from the position corresponding to the end on one side with respect to the longitudinal direction, at which the electrodes are formed, toward the end on the other side with respect to the longitudinal direction, which end has no electrode. With the air stream, a comparatively high-temperature atmosphere occurring at the end, at which the electrodes are formed, can be cooled. In this manner, uniformalizing of the temperature distribution in the longitudinal direction can be enhanced, the illuminance can be uniformalized, and the erasing energy efficiency can be enhanced.

DESCRIPTION OF THE PREFERRED EMBODIMENTS

The present invention will hereinbelow be described in further detail with reference to the accompanying drawings.

Figure 1A:
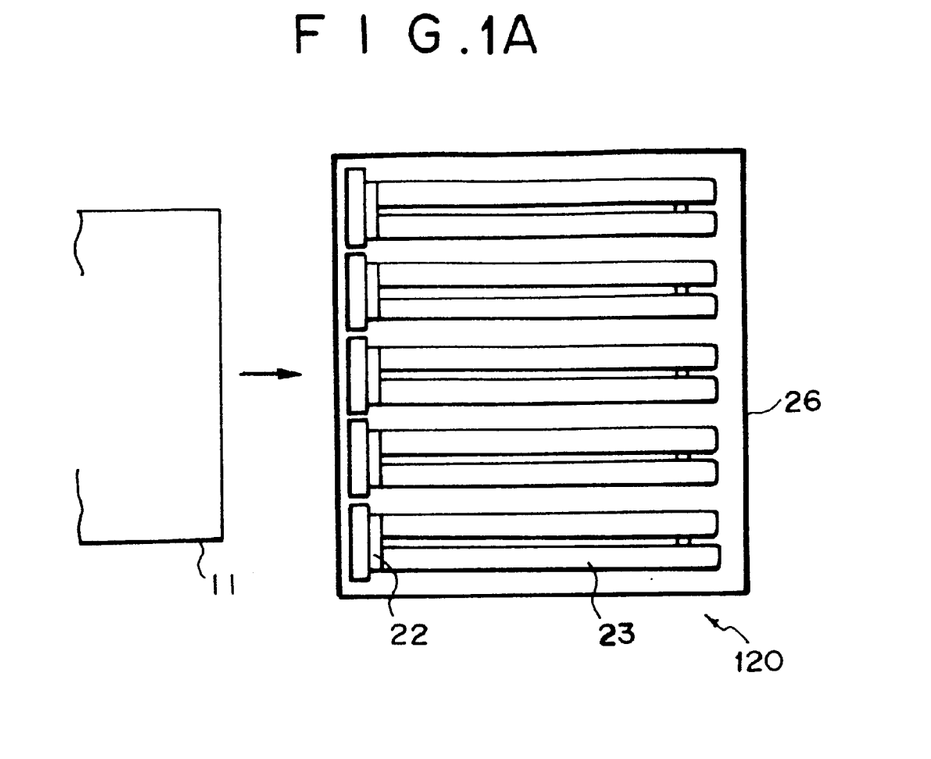
FIG. 1A is a plan view showing an embodiment of the first radiation image erasing apparatus in accordance with the present invention, wherein twin fluorescent lamps are employed.
Figure 1B:
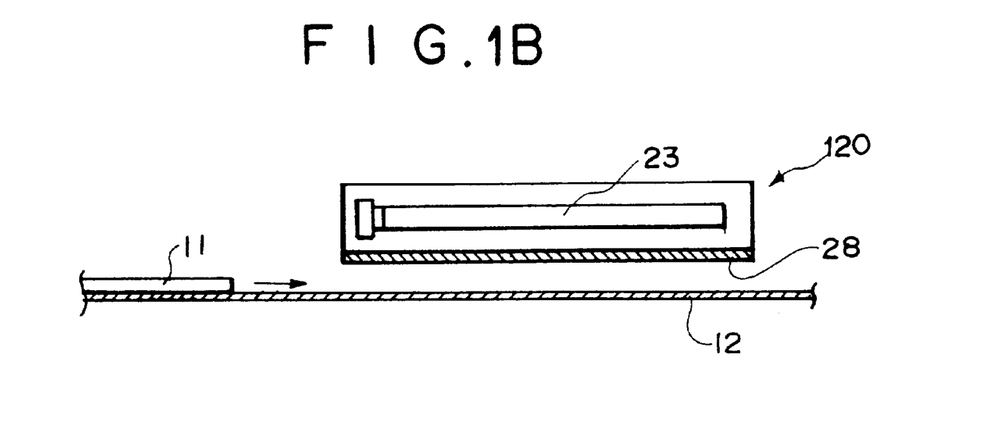
FIG. 1B is a sectional front view showing the embodiment of FIG. 1A.

FIG. 1A is a plan view showing an embodiment of the first radiation image erasing apparatus in accordance with the present invention, wherein twin fluorescent lamps are employed. FIG. 1B is a sectional front view showing the embodiment of FIG. 1A.

With reference to FIGS. 1A and 1B, in a radiation image erasing apparatus 120, a stimulable phosphor sheet 11, on which energy having been stored thereon during its exposure to radiation remains, is moved with respect to a plurality of fluorescent lamps 23, 23, . . . , which produce erasing light. The erasing light is irradiated to the stimulable phosphor sheet 11 while the stimulable phosphor sheet 11 is being moved, and energy remaining on the stimulable phosphor sheet 11 is thereby released. The plurality of the fluorescent lamps 23, 23, . . . take on the form of twin fluorescent lamps and are located such that they may stand side by side with one another in a direction that intersects perpendicularly to the longitudinal direction of each fluorescent lamp. In the fluorescent lamps 23, 23, . . . , electrodes 22, 22, . . . are formed collectively at ends on one side with respect to the longitudinal direction. The radiation image erasing apparatus 120 is provided with a filter 28 comprising a first half, over which the stimulable phosphor sheet 11 passes firstly, and a second half, over which the stimulable phosphor sheet 11 passes secondly. Of the erasing light radiated out of the fluorescent lamps 23, 23, . . . , the first half and the second half restrict the passage of light having wavelengths falling within different frequency regions. The stimulable phosphor sheet 11 is located on a conveyor guide belt 12 and is conveyed along the longitudinal direction of each of the fluorescent lamps 23, 23, . . . .

The filter 28 may be constituted such that the first half may transmit primarily light having wavelengths falling within the ultraviolet region, and such that the second half may transmit light having wavelengths other than the ultraviolet region. In this manner, the erasing may be carried out with two kinds of erasing light. In such cases, the level of energy remaining on the stimulable phosphor sheet 11 can be reduced to a value between $1/7$ and $1/10$ as large as the value obtained when only one of the two kinds of erasing light is utilized. (Such a technique is described in, for example, U.S. Pat. No. 5,065,021)

How this embodiment of the first radiation image erasing apparatus in accordance with the present invention operates will be described hereinbelow.

The stimulable phosphor sheet 11 is located on the conveyor guide belt 12 and is conveyed with respect to the radiation image erasing apparatus 120 and in the direction that intersects perpendicularly to the direction, along which the fluorescent lamps 23, 23, . . . stand side by side with one another.

Figure 2A:
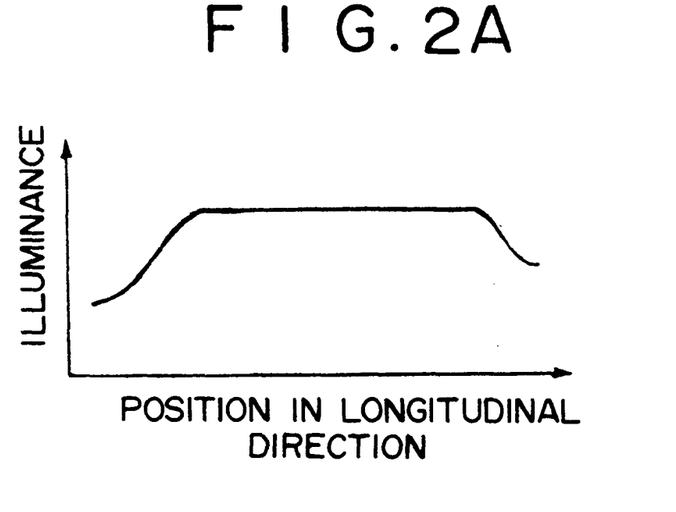
FIG. 2A is a graph showing an illuminance distribution in a direction, along which a stimulable phosphor sheet is conveyed.

The erasing light is produced by the fluorescent lamps 23, 23, . . . of the radiation image erasing apparatus 120 and is irradiated to the conveyed stimulable phosphor sheet 11. At this time, as illustrated in FIG. 2A, the illuminance distribution in the longitudinal direction of each fluorescent lamp 23 takes a pattern such that the illuminance at the positions in the vicinity of the electrodes 22, 22, . . . , which are formed at the left end, may be lower than the illuminance at the other positions. Also, as illustrated in FIG. 2B, the illuminance distribution in the direction that intersects perpendicularly to the direction, along which the stimulable phosphor sheet 11 is conveyed, takes a pattern, which is indicated by the broken line in FIG. 2B and represents the sum of the illuminance distributions with the respective fluorescent lamps (that are indicated by the solid lines in FIG. 2B).

Figure 2B:
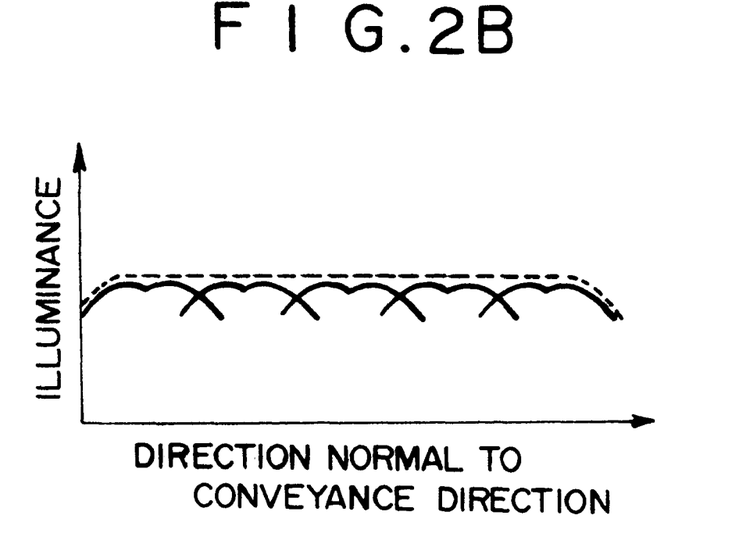
FIG. 2B is a graph showing an illuminance distribution in a direction that intersects perpendicularly to the direction, along which stimulable phosphor sheet is conveyed.

As will be understood from FIG. 2B, the illuminance distribution in the direction that intersects perpendicularly to the direction, along which the stimulable phosphor sheet 11 is conveyed, is obtained such that the difference between the highest illuminance and the lowest illuminance may be smaller than in the illuminance distribution in the direction, along which the stimulable phosphor sheet 11 is conveyed. Also, the illuminance distribution in the direction that intersects perpendicularly to the direction, along which the stimulable phosphor sheet 11 is conveyed, is more uniform than the illuminance distribution in the direction, along which the stimulable phosphor sheet 11 is conveyed.

Therefore, by virtue of the enhancement of the uniformalizing of the illuminance, the erasing energy efficiency can be enhanced.

Figure 3A:
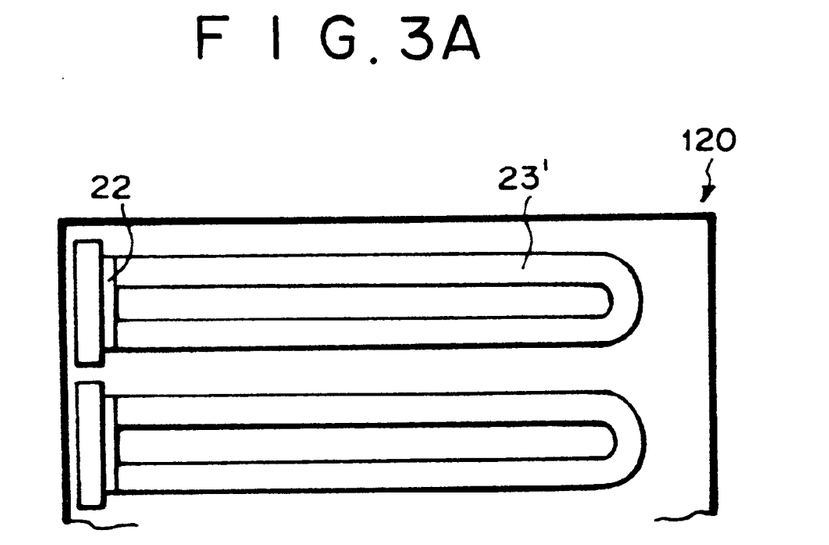
FIG. 3A is a plan view showing a different embodiment of the first radiation image erasing apparatus in accordance with the present invention, wherein U-tube fluorescent lamps are employed.
Figure 3B:
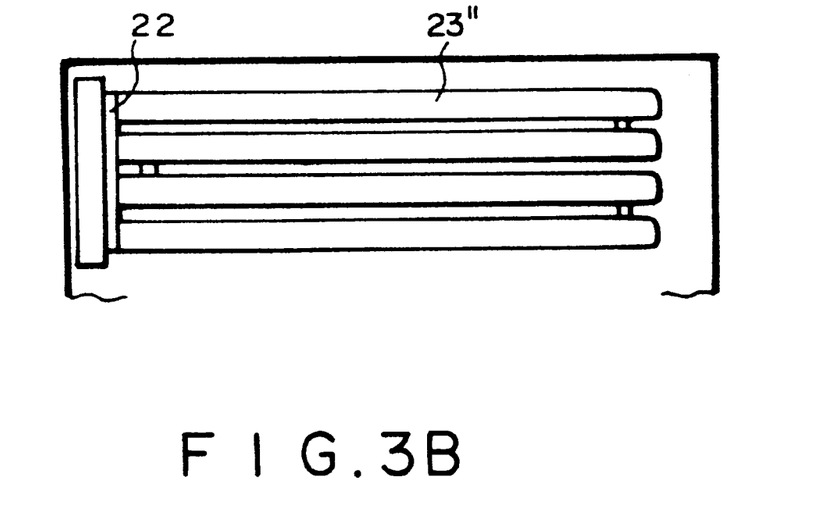
FIG. 3B is a plan view showing a further different embodiment of the first radiation image erasing apparatus in accordance with the present invention, wherein twin 2-parallel fluorescent lamps are employed.

In this embodiment of the first radiation image erasing apparatus in accordance with the present invention, the twin fluorescent lamps are employed as the erasing light source. However, in the first radiation image erasing apparatus in accordance with the present invention, the erasing light source is not limited to the twin fluorescent lamps and may be the ordinary straight-tube fluorescent lamps, each of which has the electrodes at the two ends. As another alternative, U-tube fluorescent lamps 23', 23', ... as shown in FIG. 3A, or twin 2-parallel fluorescent lamps 23", 23", ... as shown in FIG. 3B may be employed as the erasing light source.

Also, this embodiment of the first radiation image erasing apparatus in accordance with the present invention is constituted as a single unit for irradiating the erasing light to the stimulable phosphor sheet and thereby releasing energy remaining on the stimulable phosphor sheet. Alternatively, the first radiation image erasing apparatus in accordance with the present invention may be connected with a radiation image read-out apparatus or may be incorporated as a portion of a radiation image read-out apparatus.

An embodiment of the second radiation image erasing apparatus in accordance with the present invention will be described hereinbelow.

Figure 4A:
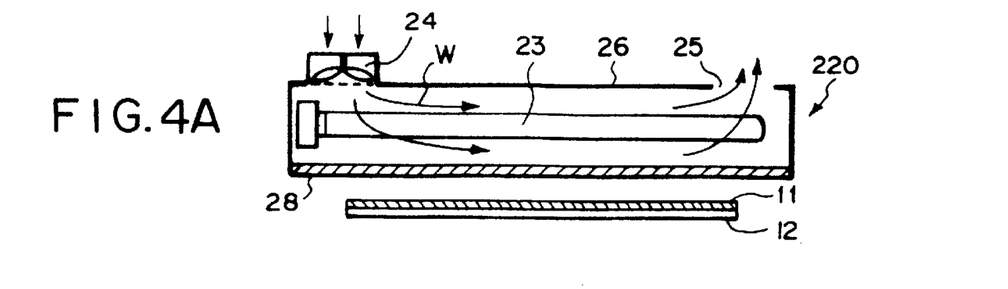
FIG. 4A is a sectional front view showing an embodiment of the second radiation image erasing apparatus in accordance with the present invention, wherein twin fluorescent lamps are employed.
Figure 4B:
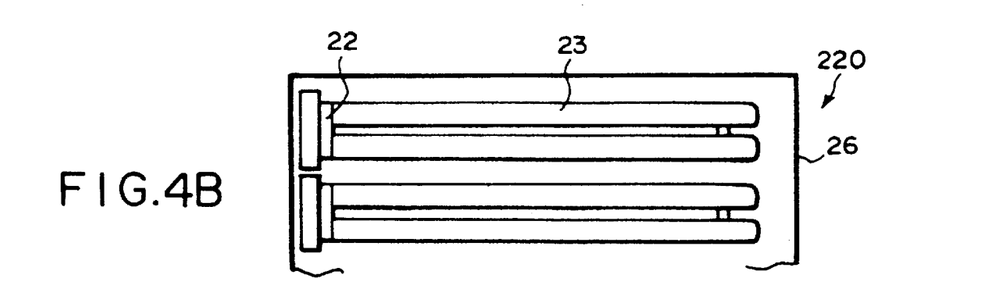
FIG. 4B is a plan view showing a major part of the embodiment of FIG. 4A.

FIG. 4A is a sectional front view showing an embodiment of the second radiation image erasing apparatus in accordance with the present invention, wherein twin fluorescent lamps are employed. FIG. 4B is a plan view showing a major part of the embodiment of FIG. 4A.

With reference to FIGS. 4A and 4B, in a radiation image erasing apparatus 220, the stimulable phosphor sheet 11, on which energy having been stored thereon during its exposure to radiation remains, is moved with respect to the plurality of the fluorescent lamps 23, 23, ..., which produce erasing light. The erasing light is irradiated to the stimulable phosphor sheet 11 while the stimulable phosphor sheet 11 is being moved, and energy remaining on the stimulable phosphor sheet 11 is thereby released. The plurality of the fluorescent lamps 23, 23, ... take on the form of twin fluorescent lamps. In the fluorescent lamps 23, 23, ..., electrodes 22, 22, ... are formed collectively at ends on one side with respect to the longitudinal direction. The radiation image erasing apparatus 220 is provided with an electrically-operated fan 24, which forms an air stream W such that the air stream W may flow from a position corresponding to the end on the one side (i.e., the left side in FIG. 4A), at which the electrodes 22, 22, ... are formed, toward an end on the other side (i.e., the right side in FIG. 4A) with respect to the longitudinal direction. The radiation image erasing apparatus 220 is also provided with a main body 26 having an air outlet 25, through which the air stream W flows out of the main body 26.

The stimulable phosphor sheet 11 is located on the conveyor guide belt 12. The stimulable phosphor sheet 11 is conveyed in the direction (the direction parallel to the plane of the sheet of FIG. 4A) that intersects perpendicularly to the direction, along which the fluorescent lamps 23, 23, ... stand side by side with one another. The radiation image erasing apparatus 220 is provided with the filter 28 comprising the first half, over which the stimulable phosphor sheet 11 passes firstly, and the second half, over which the stimulable phosphor sheet 11 passes secondly. Of the erasing light radiated out of the fluorescent lamps 23, 23, ..., the first half and the second half restrict the passage of light having wavelengths falling within different frequency regions.

The filter 28 may be constituted such that the first half may transmit primarily light having wavelengths falling within the ultraviolet region, and such that the second half may transmit light having wavelengths other than the ultraviolet region. In this manner, the erasing may be carried out with two kinds of erasing light. In such cases, as described above, the level of energy remaining on the stimulable phosphor sheet 11 can be reduced to a value between $1/7$ and $1/10$ as large as the value obtained when only one of the two kinds of erasing light is utilized.

How this embodiment of the second radiation image erasing apparatus in accordance with the present invention operates will be described hereinbelow.

The stimulable phosphor sheet 1 is conveyed with respect to the radiation image erasing apparatus 220 and in the direction that intersects perpendicularly to the direction, along which the fluorescent lamps 23, 23, ... stand side by side with one another.

Figure 5A:
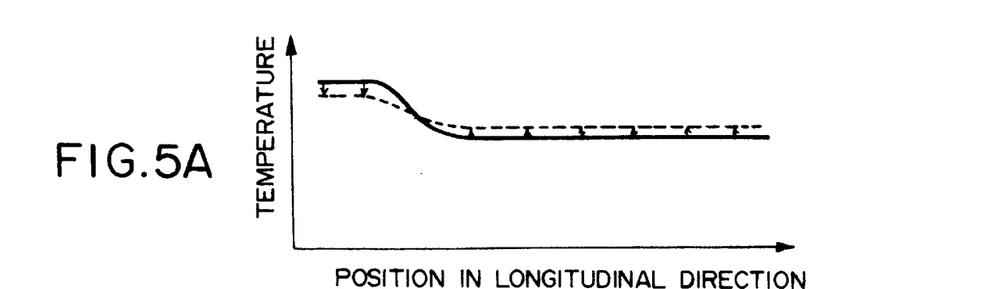
FIG. 5A is a graph showing a temperature distribution obtained with the twin fluorescent lamps in the embodiment of FIG. 4A.
Figure 5B:
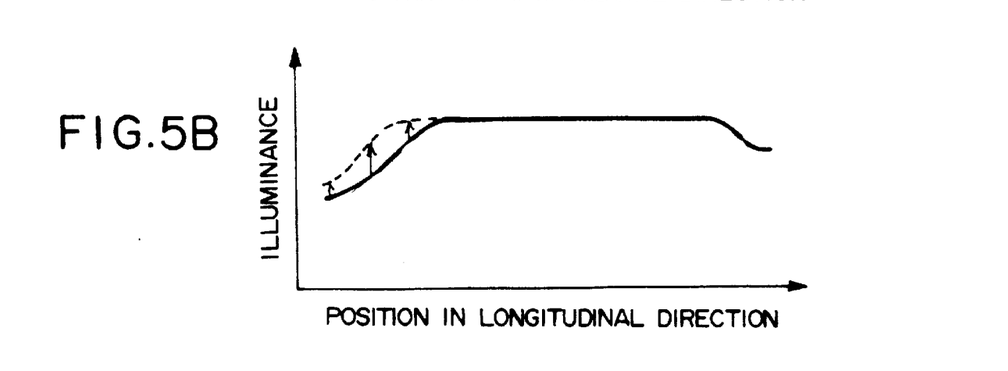
FIG. 5B is a graph showing an illuminance distribution obtained with the twin fluorescent lamps in the embodiment of FIG. 4A.

The erasing light is produced by the fluorescent lamps 23, 23, ... of the radiation image erasing apparatus 220 and is irradiated to the conveyed stimulable phosphor sheet 11. At this time, as indicated by the solid line in FIG. 5A, in cases where the electrically-operated fan 24 is not operated, the temperature distribution in the longitudinal direction of each fluorescent lamp 23 takes a pattern such that the temperatures at the positions in the vicinity of the electrodes 22, 22, ..., which are formed at the left end, may be high, and the temperatures at the other positions ranging from the middle portion to the right end are low. Also, as indicated by the solid line in FIG. 5B, the illuminance distribution takes a pattern such that it may be high as a whole, except for the positions in the vicinity of the electrodes 22, 22, ..., which are formed at the left end, and a slight portion at the right end.

Therefore, in this embodiment, the electrically-operated fan 24 is operated, and the air stream. W is formed in the main body 26 such that it may flow from the position corresponding to the left end, at which the electrodes 22, 22, ... are formed, toward the position corresponding to the right end. With the air stream W, the portion in the vicinity of the electrodes 22, 22, ... located at the left end is cooled. As a result, as indicated by the broken line in FIG. 5A, the temperature distribution in the longitudinal direction of each of the fluorescent lamps 23, 23, ... changes such that the distribution may become uniform. Also, since the temperature distribution changes such that it may become uniform, as indicated by the broken line in FIG. 5B, the illuminance distribution in the longitudinal direction of each of the fluorescent lamps 23, 23, . . . changes such that the illuminance in the vicinity of the electrodes 22, 22, . . . may become high. Therefore, the uniformalizing of the illuminance can be enhanced, and the erasing energy efficiency can be enhanced.

The second radiation image erasing apparatus in accordance with the present invention is not limited to the embodiment shown in FIG. 4A and may be embodied in various other ways. For example, in lieu of the twin fluorescent lamps 23,23, . . . , the U-tube fluorescent lamps 23', 23', . . . shown in FIG. 3A, or the twin 2-parallel fluorescent lamps 23", 23", . . . shown in FIG. 3B may be employed as the erasing light source.

Also, this embodiment of the second radiation image erasing apparatus in accordance with the present invention is constituted as a single unit for irradiating the erasing light to the stimulable phosphor sheet and thereby releasing energy remaining on the stimulable phosphor sheet. Alternatively, the second radiation image erasing apparatus in accordance with the present invention may be connected with a radiation image read-out apparatus or may be incorporated as a portion of a radiation image read-out apparatus.

What is claimed is:

1. A radiation image erasing apparatus for moving a stimulable phosphor sheet, on which energy having been stored thereon during its exposure to radiation remains, with respect to a plurality of fluorescent lamps, which produce erasing light, irradiating the erasing light to the stimulable phosphor sheet while the stimulable phosphor sheet is being moved, and thereby releasing energy remaining on the stimulable phosphor sheet, wherein the plurality of the fluorescent lamps are located such that they may stand side by side with one another in a direction that intersects perpendicularly to the direction along which each of the fluorescent lamps extends, and the direction, along which the stimulable phosphor sheet is moved with respect to the plurality of the fluorescent lamps, coincides with the direction along which each of the fluorescent lamps extends.

2. An apparatus as defined in claim 1 wherein said fluorescent lamps are selected from straight-tube fluorescent lamps, twin fluorescent lamps, twin 2-parallel fluorescent lamps, and U-tube fluorescent lamps.

3. An apparatus as defined in claim 1 wherein the apparatus is provided with a filter comprising a first half, over which said stimulable phosphor sheet passes firstly and which transmits light having short wavelengths, and a second half, over which said stimulable phosphor sheet passes secondly and which transmits light having wavelengths other than short wavelengths.

* * * * *